US012582030B2

(12) United States Patent (10) Patent No.: US 12,582,030 B2
Rinholm et al. (45) Date of Patent: Mar. 24, 2026

(54) WALK BEHIND GREENS MOWER HANDLE HEIGHT ADJUSTMENT MECHANISM

(71) Applicant: DEERE & COMPANY, Moline, IL (US)

(72) Inventors: Brent G. Rinholm, Fuquay Varina, NC (US); Jeffrey D. Witwer, Clayton, NC (US)

(73) Assignee: DEERE & COMPANY, Moline, IL (US)

( * ) Notice: Subject to any disclaimer, the term of this patent is extended or adjusted under 35 U.S.C. 154(b) by 605 days.

(21) Appl. No.: 17/805,352

(22) Filed: Jun. 3, 2022

(65) Prior Publication Data

US 2023/0389471 A1 Dec. 7, 2023

(51) Int. Cl.
| | |
|---|---|
| *A01D 34/62* | (2006.01) |
| *A01D 34/46* | (2006.01) |
| *A01D 34/82* | (2006.01) |
| *A01D 101/00* | (2006.01) |

(52) U.S. Cl.
CPC ............. *A01D 34/62* (2013.01); *A01D 34/46* (2013.01); *A01D 34/824* (2013.01); *A01D 2101/00* (2013.01)

(58) Field of Classification Search
CPC ...... A01D 34/62; A01D 34/824; A01D 34/46; B60N 2/0285
See application file for complete search history.

(56) References Cited

U.S. PATENT DOCUMENTS

| | | | |
|---|---|---|---|
| 2,263,834 A | 11/1941 | Andersen | |
| 2,602,953 A | * 7/1952 | Dalglish | A01D 34/62 |
| | | | 16/437 |
| 2,964,093 A | 12/1960 | Lohr et al. | |
| 3,043,551 A | 7/1962 | Louton, Jr. et al. | |
| 3,445,143 A | 5/1969 | Swenson | |
| 3,702,016 A | * 11/1972 | Keesee | B62D 51/001 |
| | | | 16/437 |
| 3,756,094 A | 9/1973 | Mauron | |
| 3,806,191 A | 4/1974 | Stegmaier | |
| 3,930,632 A | 1/1976 | Shigeta et al. | |
| 4,469,184 A | * 9/1984 | Simpson | A01B 33/08 |
| | | | 172/41 |

(Continued)

FOREIGN PATENT DOCUMENTS

| | | |
|---|---|---|
| DE | 202013005119 U1 | 6/2013 |
| GB | 2178994 A | 2/1987 |

(Continued)

OTHER PUBLICATIONS

Great Britain Search Report and Examination Report issued in application No. GB2303670.0 dated Aug. 31, 2023 (05 pages).

(Continued)

*Primary Examiner* — Joseph M Rocca
*Assistant Examiner* — Julia C Tran

(57) ABSTRACT

A walk behind greens mower handle height adjustment mechanism includes a lower handle frame extending upwardly and rearwardly from a reel cutting unit, an upper handle frame slidably connected to the lower handle frame, and a handle height adjustment mechanism between the lower handle frame and the upper handle frame. An activation lever on the lower handle frame locks and unlocks the upper handle frame from the lower handle frame.

8 Claims, 5 Drawing Sheets

(56) References Cited

U.S. PATENT DOCUMENTS

| | | | | |
|---|---|---|---|---|
| 4,863,289 | A * | 9/1989 | Lecerf | B60N 2/0705 296/65.14 |
| 5,007,682 | A | 4/1991 | Kuwabara et al. | |
| 5,028,028 | A | 7/1991 | Yamada et al. | |
| 5,323,998 | A | 6/1994 | Aihara | |
| 5,358,207 | A * | 10/1994 | West | B60N 2/0705 297/311 |
| 6,101,678 | A | 8/2000 | Malloy et al. | |
| 7,758,008 | B2 * | 7/2010 | Kojima | B60N 2/0843 297/344.1 |
| 8,839,692 | B2 | 9/2014 | Yanai et al. | |
| 11,051,450 | B2 | 7/2021 | Goman et al. | |
| 2004/0194982 | A1 * | 10/2004 | Fukuzumi | B62D 51/06 172/42 |
| 2006/0053763 | A1 * | 3/2006 | Stover | A01D 34/824 56/14.7 |
| 2006/0090439 | A1 * | 5/2006 | Anderson | A01D 34/47 56/10.2 G |
| 2008/0078156 | A1 * | 4/2008 | Qiao | A01D 34/824 56/16.7 |
| 2008/0121065 | A1 * | 5/2008 | Yanai | A01B 33/028 74/491 |
| 2009/0159600 | A1 * | 6/2009 | Kobayashi | F17C 13/085 220/562 |
| 2012/0132778 | A1 * | 5/2012 | Nakamura | B60N 2/0887 248/429 |
| 2020/0146213 | A1 * | 5/2020 | Goman | A01D 34/47 |
| 2020/0245555 | A1 * | 8/2020 | Colber | A01D 34/68 |
| 2021/0243948 | A1 * | 8/2021 | Burns, III | A01D 34/824 |
| 2021/0323447 | A1 * | 10/2021 | Duke | B60N 2/0806 |
| 2022/0408640 | A1 * | 12/2022 | Hiller | A01D 34/6818 |

FOREIGN PATENT DOCUMENTS

| | | | | | |
|---|---|---|---|---|---|
| GB | | 2594379 | A | 10/2021 | |
| JP | | 1996-051842 | A | 2/1996 | |
| JP | | 2021185884 | A | 12/2021 | |
| WO | WO-2004086850 | A1 * | 10/2004 | | A01D 34/824 |
| WO | WO 2013002773 | A1 | 1/2013 | | |
| WO | WO 2023274138 | A1 | 1/2023 | | |

OTHER PUBLICATIONS

Great Britain Combined Search and Examination Report issued in application No. GB2416834.6 dated Jan. 22, 2025, 06 pages.

* cited by examiner

WALK BEHIND GREENS MOWER HANDLE HEIGHT ADJUSTMENT MECHANISM

FIELD OF THE INVENTION

This invention relates to grass mowing machines and specifically to walk behind greens mowers.

BACKGROUND OF THE INVENTION

A walk behind greens mower has a horizontally aligned reel cutting unit that is designed to provide a high quality cut on golf course greens. The handle assembly may support operator controls and displays. U.S. patent Ser. No. 11/051, 450 for Walk Reel Mower with a Telescopic Handle Assembly describes a two part telescopic assembly including a lower support and an upper mount that telescopes upwardly and downwardly over the support to adjust the handle height with a locking pin that may engage apertures every 1.25 inches. There is a need for a walk behind greens mower handle height adjustment mechanism that minimizes friction for ease of use when adjusting handle height. There is a need for a walk behind greens mower handle height adjustment mechanism having high strength and durability. There is a need for a walk behind greens mower handle height adjustment mechanism having more specific height settings.

SUMMARY OF THE INVENTION

A walk behind greens mower handle height adjustment mechanism includes a pair of stationary lower rails connected to a reel cutting unit, and a pair of upper rails that are slidable along the lower rails. The pair of upper rails may be locked relative to the pair of lower rails at different handle heights.

DESCRIPTION OF THE PREFERRED EMBODIMENT

Figure 1:
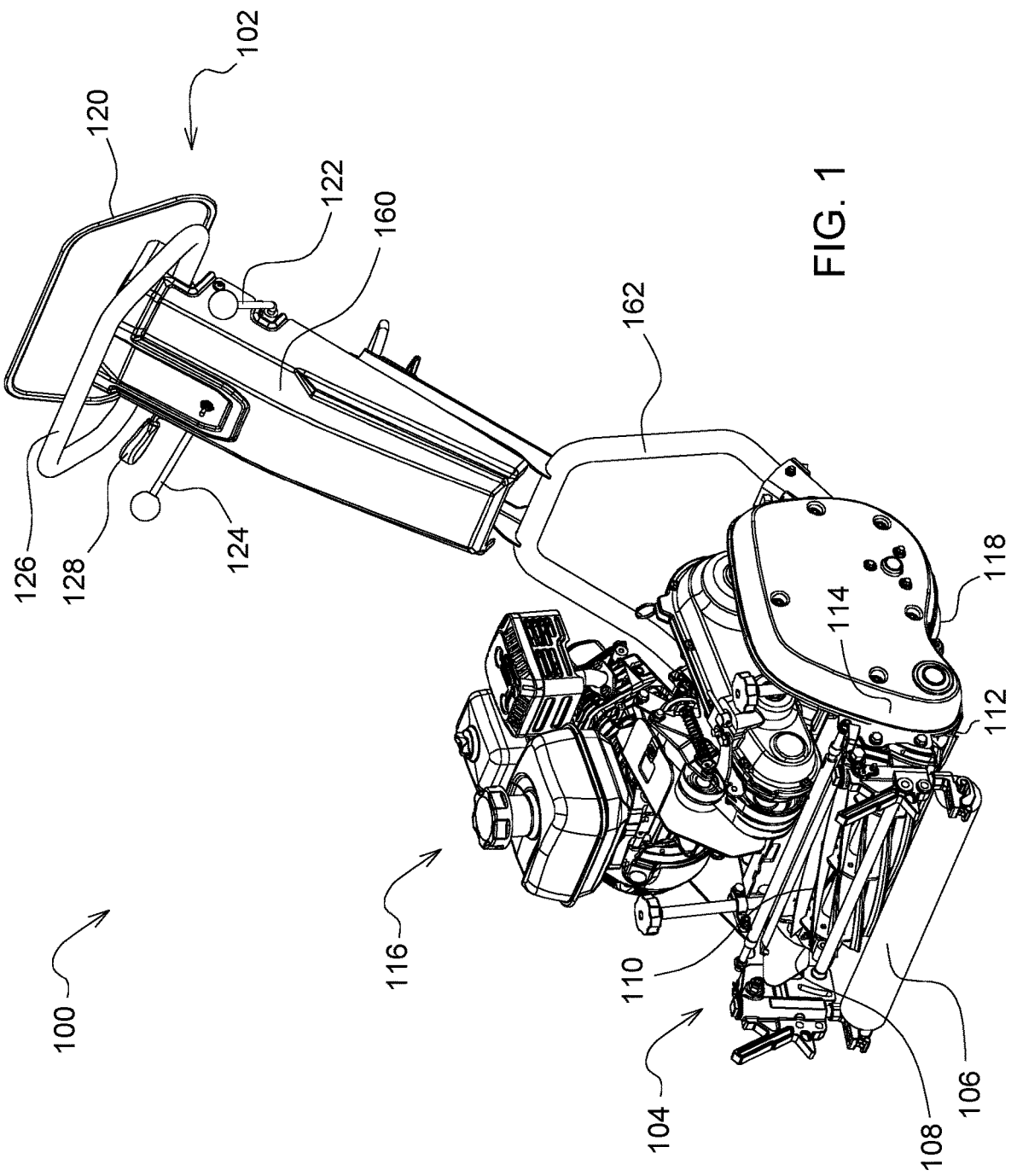
FIG. 1 is a perspective view of a walk behind greens mower having a handle height adjustment mechanism according to one embodiment of the invention.
Figure 2:
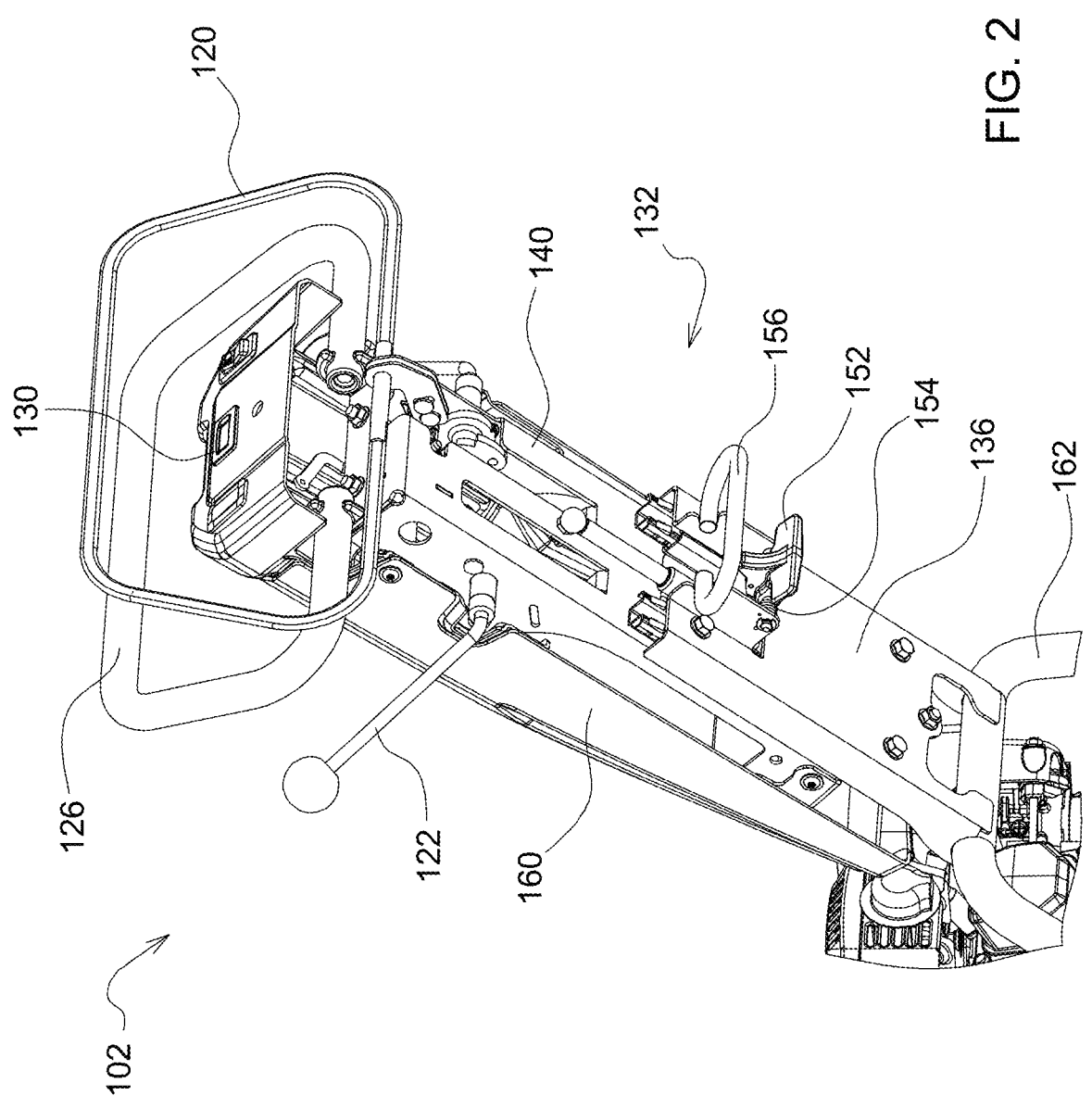
FIG. 2 is a perspective view of a walk behind greens mower handle height adjustment mechanism according to one embodiment of the invention.
Figure 3:
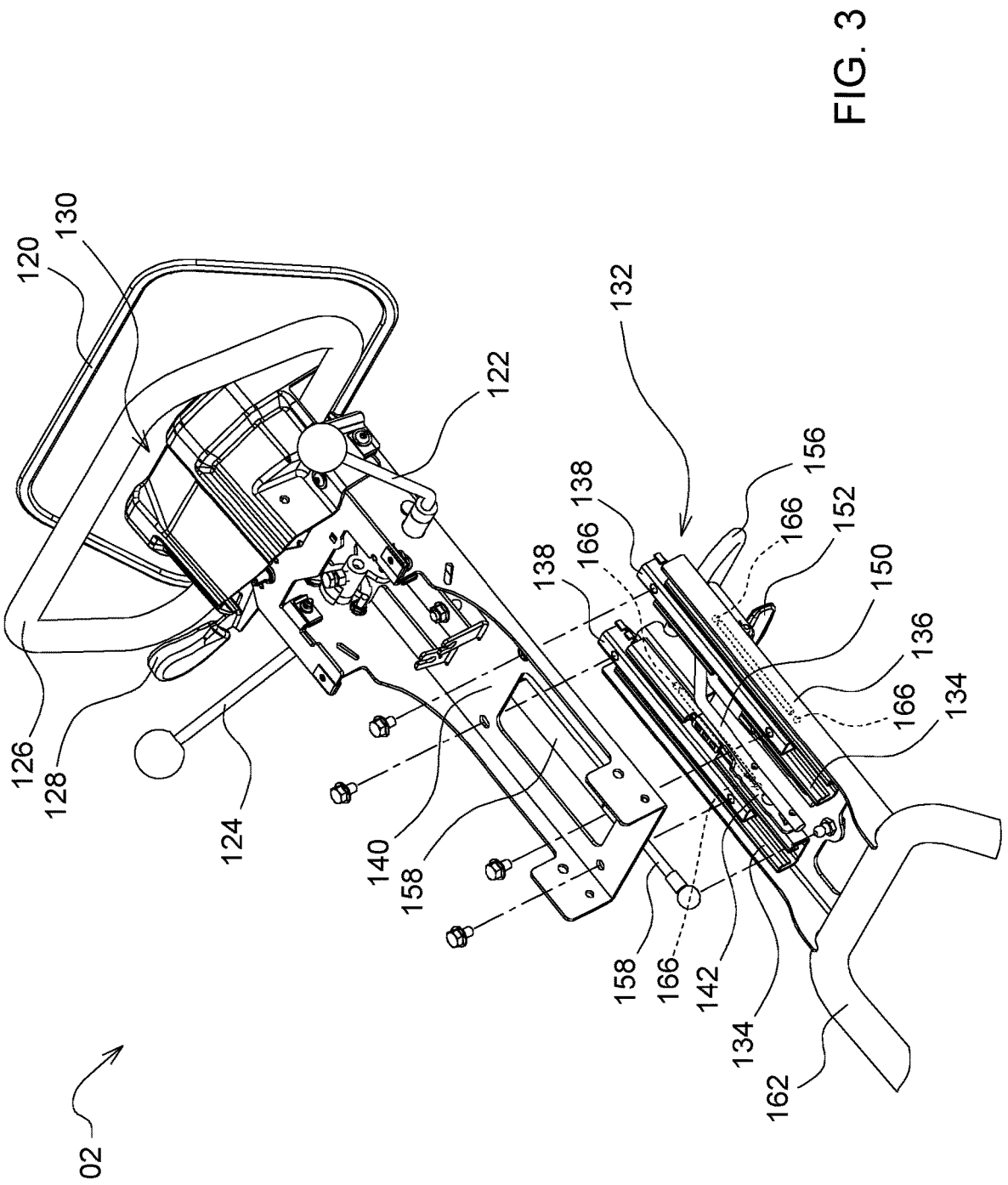
FIG. 3 is a partially exploded perspective view of a walk behind greens mower handle height adjustment mechanism with the cover removed according to one embodiment of the invention.
Figure 4:
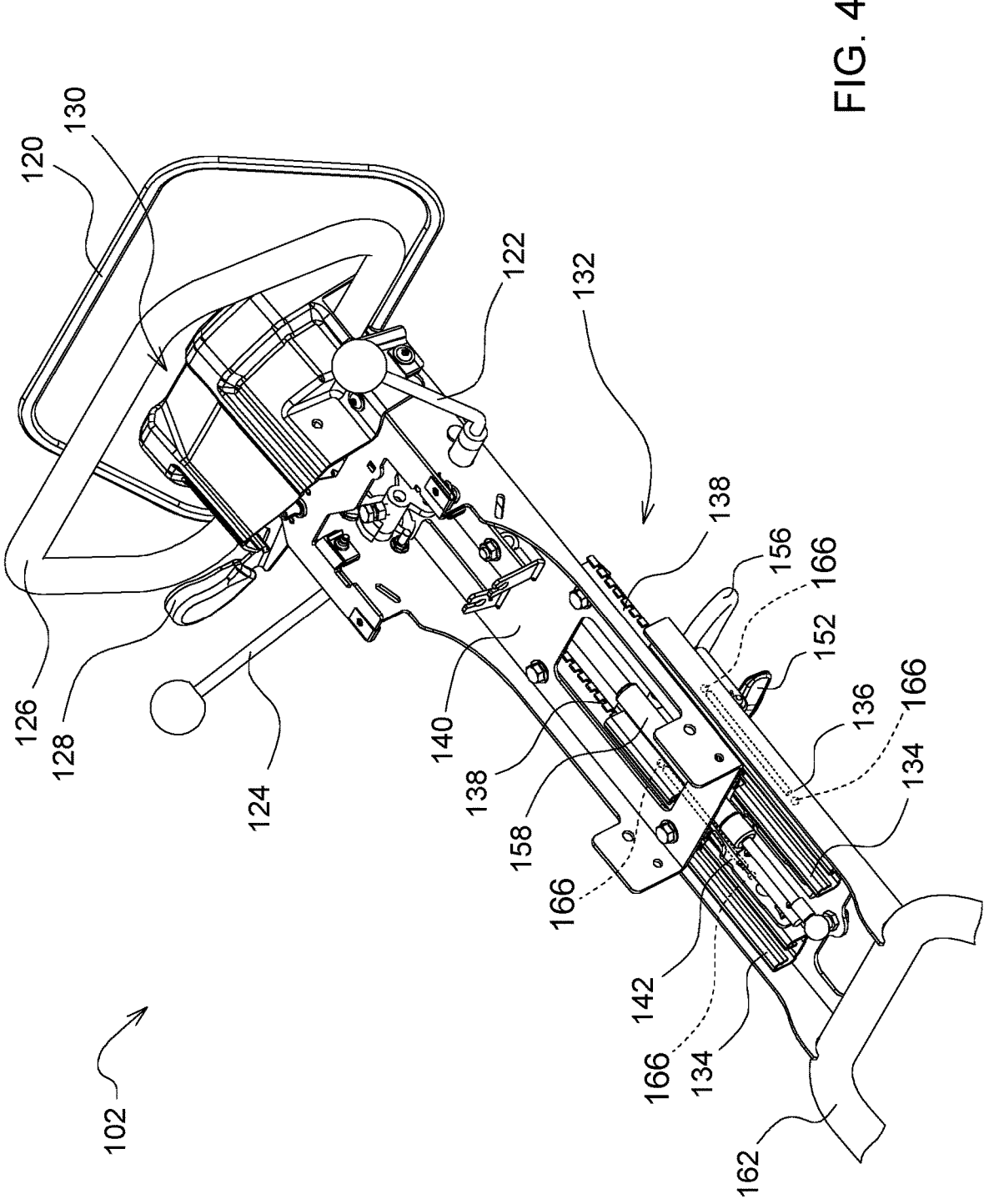
FIG. 4 is a perspective view of a walk behind greens mower handle height adjustment mechanism with the cover removed according to one embodiment of the invention.
Figure 5:
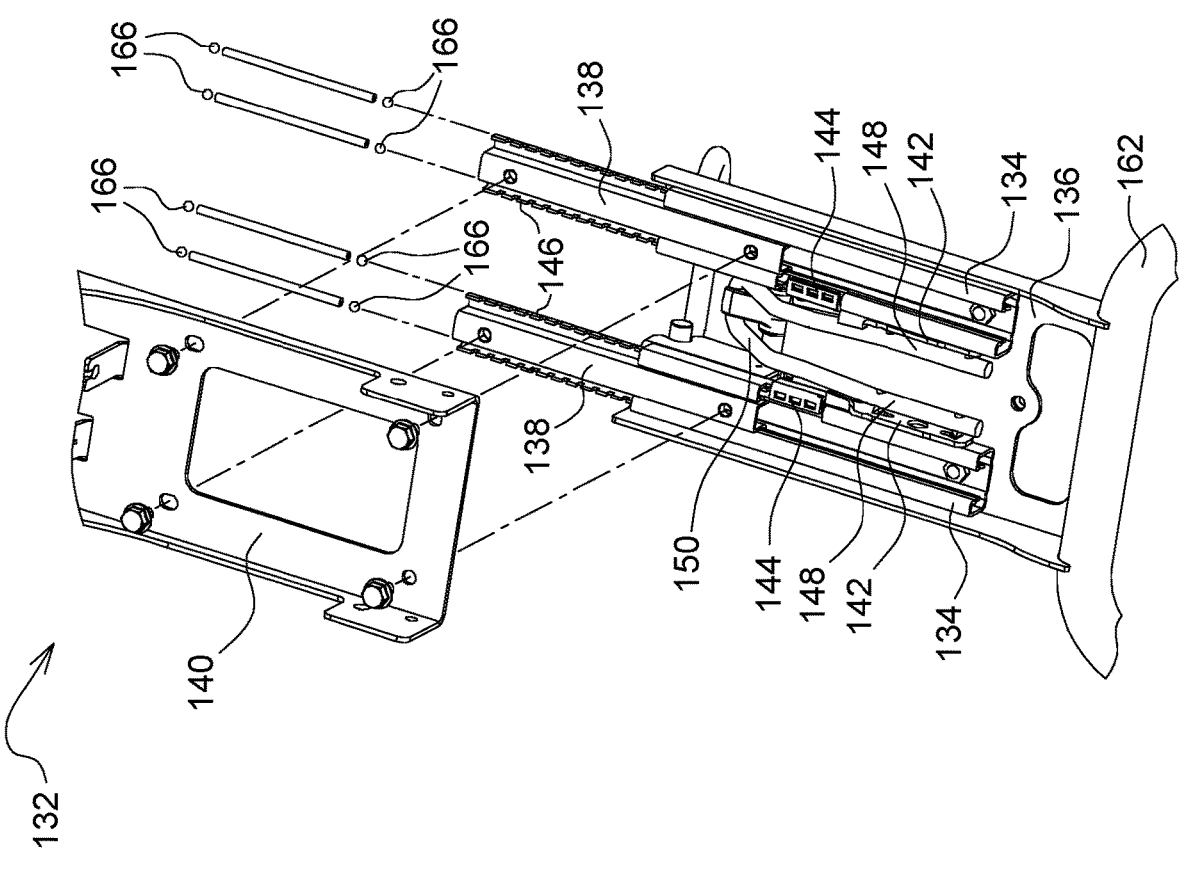
FIG. 5 is an exploded perspective view of a walk behind greens mower handle height adjustment mechanism with the cover removed according to one embodiment of the invention.

In one embodiment, as shown in FIGS. 1-5, walk behind greens mower 100 may include handle assembly 102 extending rearwardly and upwardly from reel cutting unit 104. The reel cutting unit may be supported by front roller 106 and may rotate cutting reel 108 including a plurality (i.e., 7, 11 or 14) of spiral cutting blades 110 that rotate on a horizontal axis in close proximity to stationary bedknife 112. The cutting reel may be rotated by an electric or hydraulic motor 114. A power source such as internal combustion engine 116 or battery may provide power to the motor. The engine or battery also may power a drive system to rotate traction roller 118 to propel the greens mower along the turf surface.

In one embodiment, walk behind greens mower 100 may include several operator controls which may be mounted on or to handle assembly 102. These controls may include bail 120 which may pivot relative to handle loop 126, clutch lever 122, brake lever 124, and throttle lever 128. Additionally, walk behind greens mower 100 may include display 130 mounted on or to the handle. Wiring harnesses or push pull cables may connect the operator controls to the reel cutting unit, engine or battery, and drive system.

In one embodiment, walk behind greens mower handle assembly 102 may include lower handle frame 136, upper handle frame 140, and handle height adjustment mechanism 132 between the upper and lower handle frames. Each of the upper and lower handle frames may be generally planar sheet metal panels at least about 4 inches in width. Lower handle frame 138 may be joined or attached at two points to inverted U-shape bar 162 which may extend upwardly and rearwardly from reel cutting unit 104. Upper handle frame 140 may be slidably connected to lower handle frame 138 by handle height adjustment mechanism 132. The upper handle frame also may be joined or attached at two points to handle loop 126 and display 130. The handle height adjustment mechanism may include a pair of laterally spaced stationary lower rails 134 both of which may be secured to lower handle frame 136, and a pair of laterally spaced sliding upper rails 138 attached to upper handle frame 140. The handle height adjustment mechanism also may include sliding devices such as rollers 166 or bearings disposed between each lower rail and upper rail to minimize friction and reduce force required to adjust the handle height. Spacer bars may be positioned between the rollers or bearings. The handle height adjustment mechanism provides high strength and durability. Upper and lower rails with sliding devices therebetween also have provided high strength and durability for adjusting motor vehicle seats forward and backward.

In one embodiment, walk behind greens mower handle height adjustment mechanism 132 may be locked and unlocked by the operator when adjusting handle height. The handle height adjustment mechanism may include a pair of side lock plates 142. Both side lock plates 142 may have a plurality of holes 144. For example, each of the holes may be spaced about 10 mm apart. The holes may engage teeth 146 which also may be spaced at 10 mm intervals along the sides of upper rails 138. Alternatively, the side lock plates may have teeth that engage holes in the sides of the upper rails. The 10 mm spacing between each of the holes and each of the teeth provide a large number of handle height settings. Each side lock plate 142 may be attached to one of a pair of legs 148 of activation link 150. Activation link 150 may be an inverted U-shaped member that may be pivotable to move both side lock plates 142 between locked and unlocked positions. Activation link 150 also may be biased to provide a force to continually urge both side lock plates toward the locked position engaging teeth 146 on upper rails 138.

In one embodiment, walk behind greens mower handle height adjustment mechanism 132 may include activation lever 152. The activation lever may be pivotally mounted on the rear of lower handle frame 136. The operator may pull up activation lever 152 to pivot a hook-shaped part 164 of the activation lever to engage and pivot activation link 150 to the unlocked position. Spring 154 may bias activation lever 152 down toward the locked position, and the operator may brace his or her palm on support 156 to pull up the activation lever. Once activation lever 152 is pulled up to pivot activation link 150, the activation link may force both side lock plates 142 to pivot away from the sides of upper rails 138 to disengage teeth 146 from holes 144. When handle height adjustment mechanism 132 is in the unlocked position, the operator may slide upper handle frame 140 up or down to another handle height, then push activation lever 152 back to the locked position so that activation link 150 can pivot both side lock plates 142 back into engagement with the upper rails.

In one embodiment, walk behind greens mower handle height adjustment mechanism 132 may include spring, shock absorber or dampening member 158 positioned between lower handle frame 136 and upper handle frame 140. The spring, shock absorber or dampening member may provide an upward biasing force to upper handle frame 140 to increase handle height.

Having described the preferred embodiment, it will become apparent that various modifications can be made without departing from the scope of the invention as defined in the accompanying claims.

The invention claimed is:

1. A walk behind greens mower handle height adjustment mechanism, comprising:

first stationary lower rail and a second stationary lower rail connected to a reel cutting unit;

a first upper rail and a second upper rail that are slidable along the first and second stationary lower rails, respectively;

a plurality of sliding devices between the upper and the lower rails;

an activation lever configured to cause locking and unlocking of the pair of upper rails and lower rails with respect to each other;

a biasing member configured to bias said activation lever toward an activation lever locked position; and an activation link configured to bias a first side lock plate and a second side lock plate toward first and second side lock plate locked positions wherein said first side lock plate locks said first upper rail with respect to said first stationary lower rail in the first side lock plate locked position and said second side lock plate locks said second upper rail with respect to said second stationary lower rail in the second side lock plate locked position;

wherein activation of the activation lever to cause locking of the pair of upper rails and lower rails with respect to each other comprises causing said first side lock plate to lock said first upper rail with respect to said first stationary lower rail and said second side lock plate to lock said second upper rail with respect to said second stationary lower rail; and wherein the pair of upper rails may be locked relative to the pair of lower rails at a plurality of different handle heights.

2. The walk behind greens mower handle height adjustment mechanism of claim 1 wherein the pair of side lock plates comprises a plurality of holes that are engageable to a plurality of teeth along the sides of the pair of upper rails.

3. The walk behind greens mower handle height adjustment mechanism of claim 1 further comprising a dampening member positioned between the pair of upper rails and the pair of lower rails.

4. A walk behind greens mower handle height adjustment mechanism, comprising:

a pair of stationary lower rails attached to a lower handle frame;

a pair of sliding upper rails attached to an upper handle frame;

a pair of side lock plates positioned along the pair of sliding upper rails;

an activation link having first and second legs configured to pivot the pair of side lock plates to selectively engage the pair of upper rails at a plurality of different handle heights upon actuation of an activation lever; and the activation lever pivotably mounted to the lower handle frame, said activation lever configured to move said activation link between locked and unlocked positions.

5. The walk behind greens mower handle height adjustment mechanism of claim 4 wherein the activation lever has a hook shape to engage the activation link for pivoting the pair of side lock plates.

6. The walk behind greens mower handle height adjustment mechanism of claim 4 further comprising a plurality of sliding devices between the pair of sliding upper rails and the pair of stationary lower rails.

7. The walk behind greens mower handle height adjustment mechanism of claim 4 further comprising a biasing member between the lower handle frame and the upper handle frame.

8. The walk behind greens mower handle height adjustment mechanism of claim 4 further comprising a plurality of holes in the pivoting lock plates that engage a plurality of teeth on the sides of the upper rails.

\* \* \* \* \*